United States Patent [19]

Sorin et al.

[11] Patent Number: 5,202,745

[45] Date of Patent: Apr. 13, 1993

[54] POLARIZATION INDEPENDENT OPTICAL COHERENCE-DOMAIN REFLECTOMETRY

[75] Inventors: Wayne V. Sorin, Mountain View; Brian L. Heffner, Redwood City, both of Calif.

[73] Assignee: Hewlett-Packard Company, Palo Alto, Calif.

[21] Appl. No.: 844,905

[22] Filed: Mar. 2, 1992

Related U.S. Application Data

[63] Continuation of Ser. No. 610,188, Nov. 7, 1990, abandoned.

[51] Int. Cl.$^5$ .................. G01B 9/02; G01N 21/84
[52] U.S. Cl. ................................ 356/73.1; 356/351
[58] Field of Search .......................... 356/73.1, 351

[56] References Cited

U.S. PATENT DOCUMENTS 4,653,915  3/1987  Frigo et al. .................. 356/351 X
4,968,112  11/1990  Lovely et al.

FOREIGN PATENT DOCUMENTS 2165118  9/1984  United Kingdom .

OTHER PUBLICATIONS

K. Hotate et al. "Reflectometry by Means of Optical-Coherence Modulation", Electronics Letters, vol. 26, No. 22, Oct. 26, 1989, pp. 1503-1505.

Takao Ooka, "Trends in Optical Communication Measuring Technology and Measuring Instruments", JEE? Journal of Electronic Engineering, vol. 26, No. 267, Mar. 1989, pp. 64-70.

D. Kreit and R. C. Youngquist; "Polisation-Insensitive Optical Heterodyne Receiver for Coherent FSK Communications", Electronics Letters, Feb. 12, 1987, vol. 23, No. 4.

"Review of Long Wavelength Single-Mode Optical Fiber Reflectometry Techniques", Peter Healey, Journal of Lightwave Technology, vol. LT-3, No. 4, pp. 876-886, (Aug. 1985).

"OFDR Diagnostics For Fibre And Integrated-Optic Systems", S. A. Kingsley and D. E. N. Davies, Electronics Letters, vol. 21, No. 10, pp. 434-435, (Mar. 1985).

"Optical Frequency Domain Reflectometry In Single-Mode Fiber", W. Eickhoff and R. Ulrich, Appl. Phys. Lett., 39(9), pp. 693-695 (Nov. 1981).

"Investigation of Optical Components In Micrometer Range Using An OTDR System With The Balanced Heterodyne Detection", R. P. Novak, H. H. Gilgen, R. P. Salathe, Sep. 20-21, 1988.

"High Resolution Optical Time Domain Reflectometry For The Investigation Of Integrated Optical Devices", P. Breaud, et al. IEEE Journal of Lightwave Tech., vol. 25 (1989) pp. 755-759.

"Optical Coherence-Domain Reflectometry: A New Optical Evaluation Technique", Youngquist, et al. Optics Letters, vol. 12, No. 3, pp. 158-160, (Mar. 1987).

"New Measurement System For Fault Location In Optical Waveguide Devices Based On An Interfero- (List continued on next page.)

Primary Examiner—Vincent P. McGraw

[57]  ABSTRACT

An optical coherence-domain reflectometry system provides an interferometer driven by a broadband incoherent light source with the device under test connected to one arm of the interferometer and a movable scanning mirror in the other arm providing a reference signal. The mirror moves at a controlled velocity to produce a Doppler shift in the reference signal frequency. The reference signal arm also includes a piezoelectric transducer which modulates the phase of the reference signal at a given frequency, causing a further shift in the reference signal frequency. The interference signal is detected and measured by a polarization diversity receiver. A linear polarizer in the reference signal arm is adjusted to produce equal reference signal powers in each arm of the polarization diversity receiver in the absence of a reflection signal from the test arm. The measured reflectometry signal is substantially independent of the state of polarization of the reflected signal from the device under test.

8 Claims, 7 Drawing Sheets

OTHER PUBLICATIONS metric Technique", Takada, et al. *Applied Optics,* vol. 26, No. 9, pp. 1603–1606, (May 1987).

"Guided-Wave Reflectometry With Micrometer Resolution", B. L. Danielson, et al. *Applied Optics,* vol. 26, No. 14, pp. 2836–2842, (Jul. 15, 1987).

"Characterization of Silica-Based Waveguides With An Interferometric Optical Time-Domain Reflectometry System Using a 1.3-$\mu$m-Wavelength Superluminescent Diode" Takada, et al. Optics Letters, vol. 14, No. 13, pp. 706–708, (Jul. 1, 1989).

"Fading Rates in Coherent OTDR", P. Healey, *Electronics Letters,* vol. 20, No. 11, pp. 443–444 (May 24, 1984).

"Birefringence and Polarisation Dispersion Measurements In High-Birefringence Single-Mode Fibres", M. Monerie, et al., *Electronics Letters,* vol. 23, p. 198 (1987).

"Measurement Of Spatial Distribution Of Mode Coupling In Birefringent Polarization-Maintaining Fiber With New Detection Scheme", K. Takada, et al, *Optics Letters,* vol. 11, No. 10, pp. 680–682 (Oct. 1986).

"Chromatic Dispersion Characterization In Short Single-Mode Fibers By Spectral Scanning Of Phase Difference In A Michelson Interferometer", Javier Pelayo, et al., *Journal of Lightwave Technology,* vol. 6, No. 12, pp. 1861–1865, (Dec. 1988).

"Three Ways To Implement Interferencial Techniques: Application To Measurements of Chromatic Dispersion, Birefringence, and Nonlinear Susceptibilities", Francois, et al., *Jn Lightwave Tech.* vol. 7, No. 3, pp. 550–553 (Mar. 1989).

"Measurement Of Mode Couplings And Extinction Ratios In Polarization-Maintaining Fibers", Tsubokawa, *Journal of Lightwave Technology,* vol. 7, No. 1, pp. 45–50, (Jan. 1989).

"Polarization-State Control Schemes For Heterodyne Or Homodyne Optical Fiber Communications", Okoshi, *Journal of Lightwave Technology,* vol. LT-3, No. 6, pp. 1232–1237, (Dec. 1985).

"Polarization Independent Coherent Optical Receiver", B. Glance, *Journal of Lightwave Technology,* vol. LT-5, No. 2, pp. 274–276, (Feb. 1987).

"Polarisation-Insensitive Operation of Coherent FSK Transmission System Using Polarisation Diversity", Ryu, et al., *Electronics Letters,* vol. 23, No. 25, pp. 1382–1384, (Dec. 3, 1987).

"First Sea Trial of FSK Heterodyne Optical Transmission System Using Polarisation Diversity" Ryu, et al, *Electronics Letters,* vol. 24, No. 7, pp. 399–400, (Mar. 31, 1988).

"New Phase and Polarization-Insensitive Receivers For Coherent Optical Fibre Communication Systems" Singh, et al, *Optical And Quantum Electronics,* vol. 21, pp. 343–346, (1989).

"Adaptive Polarisation Diversity Receiver Configuration For Coherent Optical Fiber Communication" Kersey, et al. *Electronics Letters,* vol. 25, No. 4, pp. 275–277 (Feb. 16, 1989).

N. J. Frigo, A. Dandridge and A. B. Tveten, "Technique for Elimination of Polarisation Fading in Fibre Interferometers", Electronics Letters, Apr. 12, 1984, vol. 20, No. 8, pp. 319–320.

POLARIZATION INDEPENDENT OPTICAL COHERENCE-DOMAIN REFLECTOMETRY

CROSS REFERENCE TO RELATED APPLICATION

This is a continuation of copending application Ser. No. 07/610,188 filed on Nov. 7, 1990, now abandoned.

BACKGROUND OF THE INVENTION

This invention pertains generally to the field of optical measurements and measuring devices, and more particularly to reflectometers for measuring the characteristics of optical systems.

The traditional method for making reflectometer measurements is known as optical time domain reflectometry (OTDR). This is an important nondestructive technique for analyzing and diagnosing optical systems, and it is particularly useful in the manufacturing, installation and maintenance of optical fiber systems. Briefly, the method consists of injecting a short intense pulse of light into a fiber and measuring the time-dependent backscattering light signal. This measured signal contains information about the location, type and magnitude of discontinuities, defects, and anomalies of the fiber and other factors which affect the light propagation such as temperature, mechanical strain, and electric and magnetic fields. The technique is essentially analogous to radar and sonar ranging techniques, but implemented for electromagnetic radiation at optical frequencies. The value of this technique lies largely in the fact that an optical system can be studied from a single access point, e.g. the input end of an optical fiber. This advantage obviates the necessity for dismantling the system, and it becomes extremely important when one is diagnosing very large systems such as long optical fibers. A review of this technology has been written by Peter Healey in the article entitled "Review of Long Wavelength Single-Mode Optical Fiber Reflectometry Techniques", published in the Journal of Lightwave Technology, Vol. LT-3, No. 4, August 1985, pp. 876–886.

The conventional OTDR technique becomes less useful when it is applied to smaller optical systems because of the limits on the measurement resolution inherent in this technique. The resolution is defined by the length of the injected light pulse. A reduction in this pulse length implies either a reduction in average pulse energy or an increase in peak power, both of which are constrained within certain limits. Furthermore, shorter pulses require greater bandwidths of the pulses, which are also limited for any given system. Typically the resolution obtained with an OTDR measurement is of the order of 10 meters, and in practice, the resolution limit of this technique is approximately 1 meter ["OFDR Diagnostics for Fibre and Integrated-Optic Systems"; S. A. Kingsley and D. E. N. Davies, Electronics Letters, Vol. 21, No. 10, March 1985, pp. 434–435]. Clearly the conventional OTDR method is not useful in analyzing small systems such as integrated-optic circuits, or for high-resolution fiber-optic sensing such as measuring stresses at short intervals along a fiber.

Improved resolution can be obtained by means of a method termed "optical frequency domain reflectometry (OFDR)", or also commonly referred to as FMCW (frequency modulated continuous wave) reflectometry. This method is described in the above-referenced article by Kingsley and Davies, and in the paper entitled "Optical Frequency Domain Reflectometry in Single-Mode Fiber", written by W. Eickhoff and R. Ulrich, published in Applied Physics Letters 39 (9), Nov. 1, 1981, pp. 693–695. This technique consists of injecting a highly monochromatic beam of light into the optical system, varying the frequency slowly with a time-linear sweep and detecting the backscattered signal. This detection is achieved by the heterodyne method, in that the backscattered signal is mixed coherently with the reference input signal. The beat frequency is measured, and gives the position of a reflection point in the fiber. The amplitude of the beat signal also determines the backscattering factor and attenuation factor for the reflected light. The article by Kingsley and Davies, cited above, reports a resolution of about 3 millimeters obtained by this method and estimates that this can be improved to approximately 1 mm with existing technology.

Clearly the OFDR method offers the capability of improved resolution compared to the conventional OTDR technique. Since the OFDR method is a coherent measurement of interference between a backscattering signal and a reference signal it also offers a greater dynamic range and improved signal-to-noise ratio over a standard OTDR measurement of reflected signal power. Since the OFDR method requires only low optical input signal power, the nonlinear effects of optical transmission in the fiber are reduced. However there are also certain drawbacks to the OFDR technique. Not only does the method require a highly monochromatic source, but it is also sensitive to frequency-sweep nonlinearities, and it is limited by the frequency sweep range.

Heterodyne detection has also been used in OTDR systems with very short pulses to achieve resolutions in the micrometer range. Systems of this type are described in a paper by R. P. Novak, H. H. Gilgen and R. P. Salathe entitled "Investigation of Optical Components in Micrometer Range Using an OTDR System With the Balanced Heterodyne Detection", and a paper by P. Beaud, J. Schütz, W. Hodel, H. P. Weber, H. H. Gilgen and R. P. Salathe, entitled "High Resolutional Optical Time Domain Reflectometry for the Investigation of Integrated Optical Devices", published in the IEEE Journal of Lightwave Technology, Vol. 25 (1989), pp. 755–759. For purposes of clarity this technique may be termed "coherent OTDR". These authors report that by using ultrashort pulses and a coherent detection scheme, the OTDR method can achieve resolutions of about 60 $\mu$m in air.

Further improvement in resolution has been obtained by another technique known as "optical coherence-domain reflectometry" (OCDR). This method is described in the following three articles:

(1) "Optical Coherence-Domain Reflectometry: A New Optical Evaluation Technique", by Robert C. Youngquist, Sally Carr, and D. E. N. Davies, Optics Letters, Vol. 12, No. 3, March 1987, pp. 158–160; (2) "New Measurement System for Fault Location in Optical Waveguide Devices Based on an Interferometric Technique", K. Takada, I. Yokohama, K. Chida, and J. Noda, Applied Optics, Vol. 26, No. 9, May 1, 1987, pp. 1603–1606; (3) "Guided-Wave Reflectometry with Micrometer Resolution", B. L. Danielson and C. D. Whittenberg, Applied Optics, Vol. 26, No. 14, Jul. 15, 1987, pp. 2836–2842. The OCDR method differs from the coherent OTDR technique in that instead of a pulsed light source one uses a broadband continuous-wave source with a short coherence length. The source beam enters an interferometer in which one arm has a movable mirror, with the reflected light from this mirror providing a reference beam, and the other arm contains the optical system being tested. The interference signal in the coherently mixed reflected light from the two arms is detected by the usual heterodyne method and yields the desired information about the optical system.

In essence, the OCDR technique replaces the beam pulses by the "coherent domains" in a broadband continuous beam, where a domain is defined as a section of the beam in which the light phases are coherently related. The average size of these sections is termed the "coherence length", $l_c$, and is of the order:

$$l_c \sim c/\Delta\nu, \quad (1)$$

where c is the speed of light and $\Delta\nu$ is the frequency spread of the light source. [Principles of Optics", 4th Edition, M. Born and E. Wolf, Pergamon Press, New York (1970), Section 7.5.8]. The heterodyne detection of the backscattered "domains" is accomplished by the method of "white light interferometry", in which the beam is split into the two arms of an interferometer, reflected by the adjustable mirror and the backscattering site and coherently recombined. This method utilizes the fact that interference fringes will appear in the recombined beam only when the difference in the optical path length between the two arms is less than the coherence length of the beam, $l_c$. The OCDR systems described in references (1) and (3) above make use of this principle, and reference (3) shows interferograms of fiber gaps in test systems obtained by scanning the adjustable mirror and measuring the strength of the recombined signal. Reference (1) also describes a modified method in which the mirror in the reference arm oscillates at a controlled frequency and amplitude, causing a time-varying Doppler shift in the reference signal, and the recombined signal is fed into a filtering circuit to detect the beat frequency signal.

Another variation of this technique is illustrated in reference (2), in which the reference arm mirror is at a fixed position and the difference in optical path lengths in the two arms may exceed the coherence length. The combined signal is then introduced into a second Michelson interferometer with two mirrors, one fixed in position and the other being moveable. This moveable mirror is scanned, and the difference in path length between the arms of the second interferometer compensates for the delay between the backscattered and reference signals at discrete positions of the mirror corresponding to the scattering sites. In practice, an oscillating phase variation at a definite frequency is imposed on the signal from the backscattering site by means of a piezoelectric transducer modulator (PZT) in the fiber leading to this site. The output signal from the Michelson interferometer is fed to a lock-in amplifier, which detects the beat frequency signal arising from both the PZT modulation and the Doppler shift caused by the motion of the scanning mirror. This technique has been used to measure irregularities in glass waveguides with a resolution as short as 15 μm ["Characterization of Silica-Based Waveguides with an Interferometric Optical Time-Domain Reflectometry System Using a 1.3-μm-Wavelength Superluminescent Diode", K. Takada, N. Takato, J. Noda, and Y. Noguchi, Optics Letters, Vol. 14, No. 13, Jul. 1, 1989, pp. 706–708].

In short, the OCDR technique offers the capability of high-resolution measurement of optical systems, together with all of the other advantages of coherent reflectometry. The optical dynamic range obtainable with this technique can exceed 100 dB on the power logarithmic scale, which implies that refractive index discontinuities of $10^{-5}$ producing reflected light of the order of 1 femtowatt can be detected. The fundamental limitation on the resolution is the coherence length of the light source, which can be reduced to a few microns, with a corresponding increase in source bandwidth.

The OCDR, OFDR, and coherent OTDR techniques all share a common problem arising from the polarization properties of the light beam. This problem is based on the fact that interference between two beams of light can only occur when both beams have the same polarization state. More precisely, the interference signal of two light beams is the incoherent sum of the interference signals from the beam components in two orthogonal polarization states. For example, if one beam is linearly polarized in the horizontal direction and the other beam is linearly polarized in the vertical direction, no interference will occur. Ideally, of course, when the entering beam is split into the two arms of an interferometer, and reflected and coherently recombined, the beam polarization is unchanged. Reference (2), discussed above, includes a polarizer and analyzer mutually aligned at the entrance and exit fibers of the first interferometer to enforce this requirement. In practice, any real fiber will cause a certain amount of distortion of the polarization of the light traveling through it. Furthermore this polarization distortion may be time-dependent. Polarization noise and cross-talk in a fiber may be caused by internal and external perturbations from mechanical, thermal and electromagnetic effects, and can produce fading or reduced visibility of the observed fringes in an interferogram. In addition the signature of a given backscattering site can be complicated by the group delay differences between two polarization eigenmodes in a birefringent fiber.

This problem has been recognized by those skilled in the art and has been mentioned repeatedly in the literature; see for example: "Fading Rates in Coherent OTDR", P. Healey, Electronic Letters, Vol. 20, No. 11, May 24, 1984, pp. 443–444; "Birefringence and Polarization Dispersion Measurements in High-Birefringence Single-Mode Fibers", M. Monerie and F. Alard, Electronics Letters, Vol. 23, p. 198 (1987). In fact, OCDR and interferometric techniques have been widely used to measure polarization distortion in fibers; see for example: "Measurement of Spatial Distribution of Mode Coupling in Birefringent Polarization-Maintaining Fiber with New Detection Scheme", K. Takada, J. Noda and K. Okamoto, Optics Letters, Vol. 11, No. 10, October 1986, pp. 680–682; "Chromatic Dispersion Characterization in Short Single-Mode Fibers by Spectral Scanning of Phase Difference in a Michelson Interferometer", J. Pelayo, J. Paniello, and F. Villuendas, Journal of Lightwave Technology, Vol. 6, No. 12, December 1988, pp. 1861–1865; "Three Ways to Implement Interferencial Techniques: Application to Measurements of Chromatic Dispersion, Birefringence, and Nonlinear Susceptibilities", P.-L. Francois, M. Monerie, C. Vassallo, Y. Durteste, and F. R. Alard, Journal of Lightwave Technology, Vol. 7, No. 3, March 1989, pp. 500-513; "Measurement of Mode Couplings and Extinction Ratios in Polarization-Maintaining Fibers", M. Tsubokawa, T. Higashi, and Y. Sasaki, Journal of Lightwave Technology, Vol. 7, No. 1, January 1989, pp. 45-50.

An extensive discussion of this problem is given in the article: "Polarization-State Control Schemes for Heterodyne or Homodyne Optical Fiber Communications", T. Okoshi, Journal of Lightwave Technology, Vol. LT-3. No. 6, December 1985, pp. 1232-1237. In this paper it is acknowledged that the use of polarization-maintaining fibers is theoretically a complete solution to the problem, but this solution is unsatisfactory for practical reasons. The author mentions two alternative approaches, namely a) the use of a polarization-state control device which matches the reference signal polarization with that of the test signal, and b) the use of a polarization diversity receiver (PDR) in which two orthogonal polarization components of the combined signal are detected separately and added later after an appropriate phase compensation. The author goes on to discuss various schemes for implementing approach a), with no further mention of approach b). Several problems are described that arise in one or more of these polarization-state control schemes, namely:

a) Insertion Loss. The insertion of a polarization control device may attenuate the desired reflectometry signal.

b) Endlessness in Control. The polarization-state distortion of the system may fluctuate over an unknown range, and therefore a control device of limited range may require "resetting" periodically.

c) Temporal Response. The polarization state may fluctuate with unknown rapidity. Manual control of the device may be inadequate. An automatic control feedback scheme may have too long a response time to track these fluctuations accurately.

d) Presence or Absence of Mechanical Fatigue. All schemes that include movement of mechanical components in response to polarization fluctuations suffer from the possibility of mechanical fatigue.

Each of the techniques described in the Okoshi article has at least one of the above drawbacks. The conclusion of this paper is that none of the schemes considered are fully satisfactory, and further efforts are required.

The above Okoshi paper refers only to the use of PDR technology in the context of heterodyne or homodyne optical fiber communications. The PDR is an optical heterodyne receiver that detects signals having an arbitrary polarization state, and is described in the article: "Polarization Independent Coherent Optical Receiver", B. Glance, Journal of Lightwave Technology, Vol. LT-5. No. 2, February 1987, pp. 274-276. Further discussions of the PDR technique are presented in the following articles: "Polarisation-Insensitive Operation of Coherent FSK Transmission System Using Polarisation Diversity", S. Ryu, S. Yamamoto, and K. Mochizuki, Electronics Letters, Vol. 23, No. 25, Dec. 3, 1987, pp. 1382-1384; "First Sea Trial of FSK Heterodyne Optical Transmission System Using Polarisation Diversity", S. Ryu, S. Yamamoto, Y. Namihira, K. Mochizuki and H. Wakabayashi, Electronics Letters, Vol. 24, No. 7, Mar. 31, 1988, pp. 399-400; "New Phase and Polarization-Insensitive Receivers for Coherent Optical Fibre Communication Systems", N. Singh, H. M. Gupta, and V. K. Jain, Optical and Quantum Electronics, Vol. 21, (1989), pp. 343-346; "Adaptive Polarisation Diversity Receiver Configuration for Coherent Optical Fibre Communications", A. D. Kersey, M. J. Marrone, and A. Dandridge, Electronics Letters, Vol. 25, No. 4, Feb. 16, 1989, pp. 275-277. These articles all discuss the use of PDR techniques for heterodyne reception of optical signals to eliminate the fiber polarization distortion problem. No suggestion is made of this PDR technique as a possible means of dealing with the polarization distortion of optical fibers in coherent reflectometry.

To summarize the technological state of the art, it is known that improved resolution and signal-to-noise ratios in reflectometry systems can be obtained by using coherent detection schemes; that is, optical interferometry systems in which the reflection signal is coherently mixed with a reference signal and the resulting interference signal is detected. Furthermore the optimal coherent detection scheme from the standpoint of resolution is the OCDR, in which the resolution is determined by the coherence length of the light source. This resolution can be made very small by using a broadband source.

It is also known that this coherent detection scheme, like all optical coherent detection schemes, depends on the polarization stability of the optical transmission through the system. Interference between light beams can only occur with signals having the same state of polarization. Changes in the polarization of signals in one arm of the interferometer, or uncorrelated changes in both arms, will degrade the resulting interference signal. These variations in polarization can arise from many causes, both internal and external in nature. Furthermore with respect to external causes, the variations in beam polarization may be time-dependent, arising from fluctuations in environmental conditions.

The polarization stability problem is not confined to optical coherent reflectometry systems. It occurs also in optical communication systems using coherent detection schemes. In this context solutions have been proposed of two general types: direct polarization controllers and polarization diversity receivers. The PDR systems have been designed specifically for this context.

In the reflectometry situation, one can eliminate part of the polarization stability problem by careful design and fabrication of the interferometer. Polarization-maintaining fibers can be used, and the instrument can be encased in a housing to substantially insulate it from environmental perturbations. This is only a partial solution because in operation the instrument must be connected to the device being tested, presumably through optical fibers or other transmission means, and polarization distortion may occur in these external fibers or signal conduits. Furthermore the system under test may itself produce variations in the polarization of the reflectometry signal at reflection or refraction sites or in the optical conduits within the system. These perturbations may be environmental in origin and may fluctuate with time in an essentially uncontrollable manner. Therefore, in an optical coherent reflectometer there is always a polarization instability problem with respect to the optical signals being transmitted and received in the arm of the interferometer that is connected to the device under test.

SUMMARY OF THE INVENTION

The present invention is a coherent optical reflectometry system which overcomes the problem of polarization variations and distortions in the optical fibers and system components by methods adopted from the polarization diversity receiver technique. In particular, an optical coherence domain reflectometer is disclosed having a light-emitting diode to provide a broadband source of light, and an interferometer in which one arm contains the optical system or device under test (DUT) and the other arm contains a scanning mirror to provide the reference light beam. The reflectometer further includes a polarization diversity receiver (PDR) into which the coherently recombined reflected light is directed. The scanning mirror is driven at a fixed speed to provide a Doppler-shifted reference light signal. The reference arm includes a piezoelectric transducer (PZT) which modulates the phase of the reference signal to provide an interference signal at a frequency that can be detected efficiently by a band pass filter in the PDR. In this way, the PZT simulates the action of a frequency shifter. The reference arm also contains a rotationally adjustable polarizer so that the reflected reference signal is linearly polarized. The polarization axis may be rotated about the optical axis to calibrate the reflectometer so that equal reference beam powers are provided in the two orthogonal polarization detector circuits of the PDR. Further fine-control of this polarization may be provided by a polarization controller (PC) in the DUT arm of the interferometer, although this is not necessary.

The above version of this reflectometer utilizes an unpolarized light source. In an alternative version of the invention the light source is an LED followed by a polarizer which provides polarized light. In this version, the linear polarizer in the reference beam arm is replaced by an adjustable birefringent element such as a waveplate or polarization controller. The reflectometer is calibrated by adjusting the birefringent element to balance the reference beam powers in the detector circuits of the PDR.

Further alternative versions of the reflectometer include additional polarization controllers in the interferometer reference arm or the beam output channel, or both. These PC's allow further fine-tuning adjustment and calibration of the reflectometer to compensate for perturbations in the system that affect the light polarization.

An object of this invention is to provide an optical coherence-domain reflectometer which measures reflectometry signals independently of the polarization distortion effects of the optical fibers and other components of the reflectometer system and the device under test.

A second object of the invention is to provide an optical coherence-domain reflectometer which may be easily calibrated and adjusted to provide polarization-independent reflectometry signals.

Another object of the invention is to provide an optical coherence-domain reflectometer which measures reflectometry signals independently of the polarization of the coherence domains of the light source and the interference between different polarization components of the source.

A further object of the invention is to provide a method for measuring optical coherence-domain reflectometry signals independently of the polarization distortion effects of the optical fibers and other components of the reflectometer system and the device under test.

Another object of the invention is to provide a method for easily calibrating and adjusting an optical coherence-domain reflectometer to provide polarization-independent reflectometry signals.

Yet another object of the invention is to provide a method for measuring optical coherence-domain reflectometry signals independently of the polarization of the coherence domains of the light source and the interference between different polarization components of the source.

These and other objects, advantages, characteristics and features of this invention may be better understood by examining the following drawings together with the detailed description of the preferred embodiment.

DETAILED DESCRIPTION OF THE PREFERRED EMBODIMENT

Figure 1:
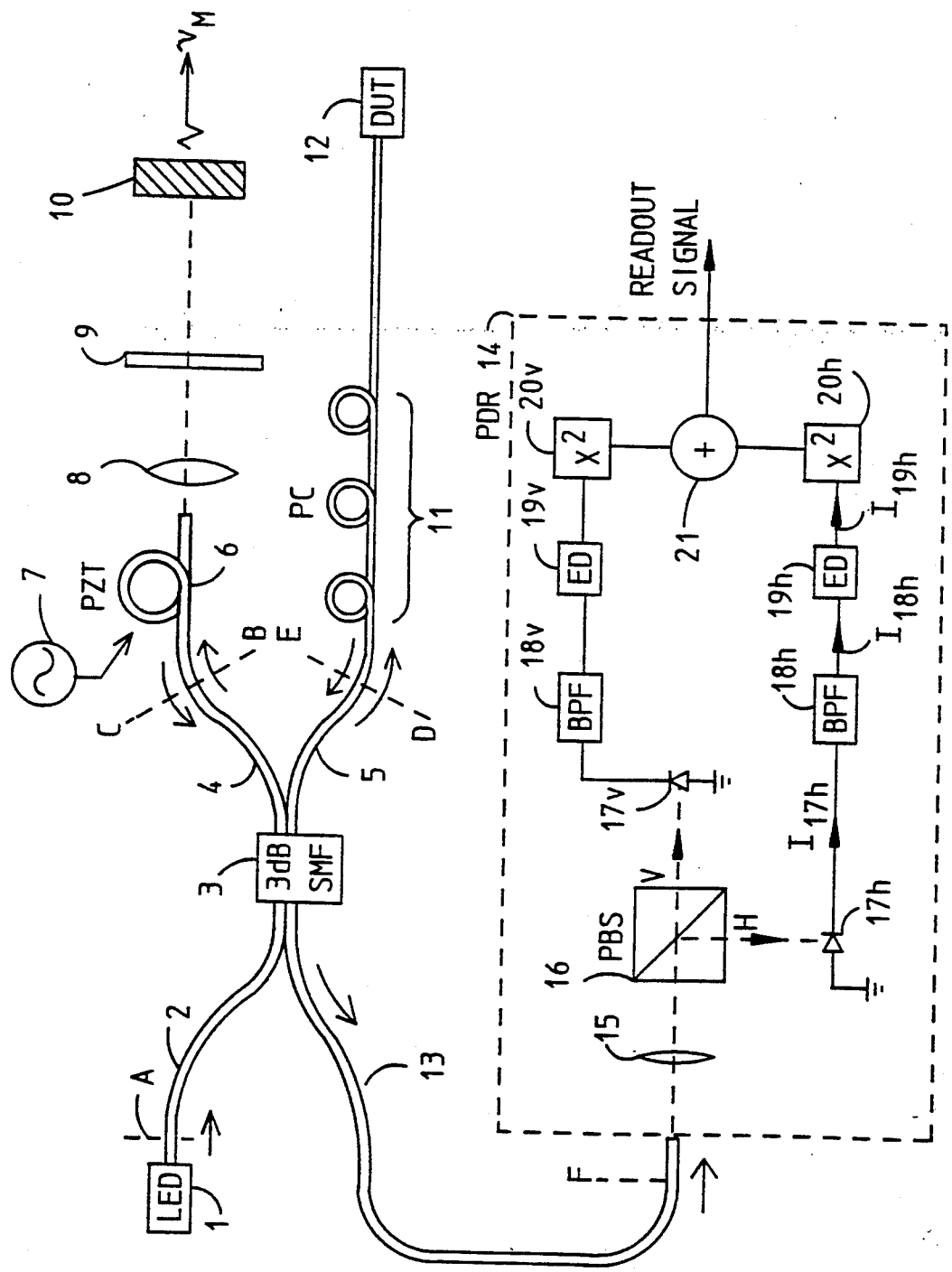
FIG. 1 is a schematic optical and electronic circuit diagram of the reflectometer of the present invention, showing the interferometer and polarization diversity receiver (PDR).

Referring to FIG. 1, an optical coherence-domain reflectometer is provided having a light source 1 which generates a broad spectrum. This source may comprise a light-emitting diode (LED) or similar means. The essential requirement of this source is that the coherence length of the light must be sufficiently short to achieve the desired resolution of the reflectometer.

The light from this source enters the optical fiber 2 which forms the input channel of an interferometer. This interferometer is of the Michelson type in which the usual half-silvered mirror or other beam splitting means is replaced by a fiber coupler. Thus in FIG. 1, the fiber 2 conducts the light to a 3 dB single mode fiber (SMF) coupler 3, such that the transmitted mode of the light is equally divided between the reference arm fiber 4 and the test arm fiber 5 of the interferometer. The light in the reference arm fiber 4 passes through a piezoelectric transducer (PZT) 6 which modulates the phase of the light signal. The PZT is driven by an oscillator 7 at a given frequency, so that the phase of the light leaving the PZT varies in a time-dependent oscillatory manner about its unmodulated value.

The light signal leaving the PZT is transmitted through a collimating lens 8 and a linear polarizer 9. This polarizer can be rotated about the optic axis of the light beam to select any desired direction of linear polarization. The linearly polarized light emerging from the polarizer 9 impinges normally on the scanning mirror 10 and is reflected. This mirror 10 is mounted on a mechanism, not shown in the drawing, by which this mirror may be moved along the beam axis in a controlled manner. The mechanism may be of any conventional type, e.g. screw mechanism, spring-solenoid, etc., that allows sufficient range, velocity, and control of the mirror's motion. The reflected light from the mirror 10 travels back through the polarizer 9, lens 8, PZT 6, and fiber 4 to the fiber coupler 3.

The light in the test arm 5 of the interferometer passes through a fiber-based polarization controller 11 (PC) which acts as a retardation waveplate to vary the polarization state of any fully or partially polarized light passing through it. From the PC the beam is directed to the optical device under test (DUT) 12, which is the system that is being measured by the reflectometer. The reflected light from the DUT returns through the PC and optical fiber of the test arm 5. This reflected light and the reflections from the reference arm 4 re-enter the fiber coupler 3 and re-combine. The SMF coupler, being reversible, directs part of this recombined beam into the output fiber 13. This output fiber 13 carries the light to the input part of a polarization diversity receiver (PDR) 14, which is the circuit in FIG. 1 enclosed by the dotted lines.

The PDR shown in FIG. 1 is adapted to detect interference signals, rather than the coded signals normally used in communication channels. The beam from the PDR input fiber 13 is directed through a focusing lens 15 onto a polarizing beam splitter 16 (PBS), which separates the beam into two linearly polarized components having orthogonal directions of polarization, denoted in the diagram by "V" (vertical) and "H" (horizontal). In accordance with the usual convention these designations refer to th direction of the electric field in the optical signal. Each component is measured separately by a photodetector, which is a photodiode in the illustrated embodiment. Thus, the vertically polarized component of the beam impinges on, and is absorbed by, a photodiode 17v, and the horizontally polarized component strikes a second photodiode 17h. The currents produced by these photodiodes 17v, 17h, are proportional to the intensities of the vertically and horizontally polarized components of the beam, respectively.

The output terminal of each photodiode is connected to the input of a bandpass filter (BPF), designated in the drawing as 18v, 18h respectively. These BPF's filter out the dc and high-frequency carrier components of the photodiode signals. The output of each BPF is connected to the input terminal of an envelope detector (ED), denoted 19v and 19h respectively in FIG. 1. The output of each ED circuit is connected to a "squaring circuit" ($X^2$), labelled 20v, 20h respectively. The squaring circuit generates an output signal proportional to the square of the input signal. Finally, the output signals from the squaring circuits are each connected to an input terminal of an "adder circuit" (+), designated 21, which produces a readout signal that is proportional to the sum of the signals from the squaring circuits 20v, 20h.

The BPF, ED, + and $X^2$ circuits are shown schematically in block diagram form in FIG. 1. These components are conventional electronic circuits. Therefore the details of their design and auxiliary components such as power and bias supplies are omitted from the FIG. 1. The electronic signals transmitted between these components may be voltage or current pulses. For clarity of understanding we assume in the following that these signals are current pulses.

Figure 5:
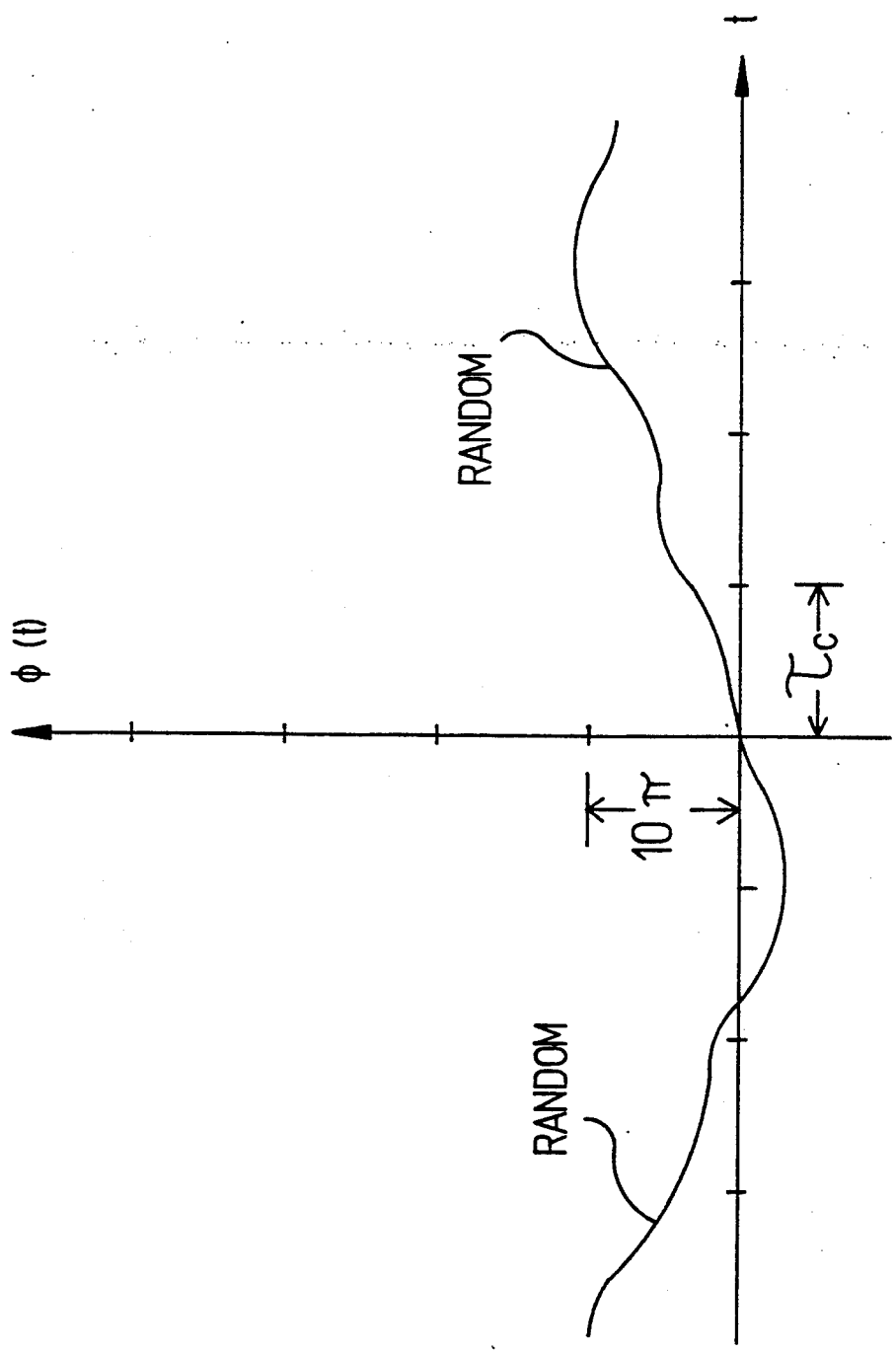
FIG. 5 is a schematic graph of the time dependence of the function $\phi(t)$.

The operation of the interferometer may be described in terms of the electric field in the optical signal. The electric field for a given coherence domain generated by the LED, evaluated at the position labelled A in the input fiber 2, may be written as a function of time:

$$\vec{E}_A(t) = \vec{E}_o e^{i(\omega t + \phi(t) + \theta_A)} + \vec{E}_{1A}(t); \quad (2)$$

where $\omega = 2\pi\nu$ is the angular carrier frequency of the light in the domain, $\vec{E}_o$ is the vector representing the amplitude and direction of the field at zero phase, $\theta_A$ is the part of the phase that depends on the location in the system where the field is observed, and $\phi(t)$ is the function that defines the statistical contributions to the phase and determines the coherence time and the limits of the domain. FIG. 5 shows a rough sketch of the function $\phi(t)$ plotted against time, assuming the domain is emitted at time zero. When t is greater than zero and less than the coherence time, denoted by $\tau_c$, $\phi$ is substantially constant. For time values outside this range, $\phi$ is a randomly varying function of time. Thus the field retains its coherence only for the range:

$$0 \leq \tau \leq \tau_c. \quad (3)$$

Finally, the coherence time is related to the coherence length discussed previously:

$$\tau_c = \frac{n}{c} l_c, \quad (4)$$

where c is the speed of light in vacuum, and n is the index of refraction in the fiber.

This description of the coherence domain in an optical beam is not completely accurate, in that we are describing the electric field outside the range $[0, \tau_c]$ as a randomly varying function, whereas in fact it is a statistical variable. Furthermore the polarization of the field outside the range of coherence defined by equation (3) is also a statistical variable. In our descriptive model here we replace this variable by the term $\vec{E}_1(t)$ in equation 2, which vanishes inside the coherence range and is a random and rapidly varying function of time outside this range. The vector $\vec{E}_{1A}$ is chosen to be perpendicular to $\vec{E}_o$, and therefore the field $\vec{E}_A(t)$ has a randomly varying polarization with time variations of order $\tau_c$.

Finally, we are using the complex representation here for the electric field. The actual fields are the real part of the foregoing expressions. In the exponential expressions, "i" represents the square root of $-1$. In addition, we are describing the field within a given coherence domain as being at a fixed frequency $\nu$. In fact there will be a spread of frequencies, represented by the bandwidth $\Delta\nu$ in equation (1).

The portion of the field entering the reference arm fiber 4 can be written at location B as:

$$\vec{E}_B(t) = \frac{1}{\sqrt{2}} \vec{E}_o e^{i(\omega t + \phi(t) + \theta_B)} + \vec{E}_{1B}(t). \quad (5)$$

This signal then passes through the PZT, which modulates the phase of the signal by adding the term:

$$\phi_{PZT}(t) = \phi_m \cos \omega_m t, \quad (6)$$

where $\omega_m = 2\pi \nu_m$ is the angular frequency at which the oscillator 7 drives the PZT. The signal then proceeds through the polarizer 9 and is reflected by the mirror 10. We assume that this mirror moves with a velocity $\nu_m$; this introduces a Doppler shift in the reflected signal given by the phase contribution:

$$\phi_D(t) = \omega_p t = 2\pi \nu_D t, \quad (7)$$
where $$\nu_o = \frac{2\nu_m}{\lambda}, \quad (8)$$

which is the well-known expression for the Doppler frequency shift. Here $\lambda$ is the wavelength of the light. Assuming further that the mirror is totally reflective, the electric field of the reflected light at location C in the fiber 4 may be written:

$$\vec{E}_C(t) = \vec{E}_r e^{i(\omega t + \phi(t) + \phi_{PZT}(t) + \phi_D(t) + \theta_C)} + \vec{E}_{1C}(t), \quad (9)$$

where $\vec{E}_r$ is the electric field vector transmitted by the polarizer 9 after reflection from the mirror 10.

In a similar manner, the portion of the optical signal entering the test arm fiber 5 has a field at the location D that may be written:

$$E_D(t) = \frac{1}{\sqrt{2}} E_o e^{i(\omega t + \phi(t) + \theta_D)} + E_{1D}(t). \quad (10)$$

We ignore the effects of the PC 11, for the moment. This signal then proceeds into the DUT 12. and a portion is reflected at a given reflection site in the DUT, characterized by the reflection coefficient R. The returning signal then has the value at E:

$$\vec{E}_E(t) = \sqrt{\frac{R}{2}} \vec{E}_o e^{i(\omega t + \phi(t) + \theta_E)} + \vec{E}_{1E}, \quad (11)$$

provided that there is no distortion of the polarization in the DUT. In general, however, this is not the case, and the return signal field at E must be written as:

$$E_E(t) = E_S e^{i(\omega t + \phi(t) + \theta_E)} + E_{1E}, \quad (12)$$

where now $\vec{E}_s$ is the direction and amplitude of the reflection signal electric field, and $|\vec{E}_s|$ is proportional to $$E_F(t) = \frac{1}{\sqrt{2}} E_r e^{i(\omega t + \phi(t) + \phi_{PET}(t) + \phi_D(t) + \phi_f')} + E_{1F}^{(r)}(t) + \quad (13)$$

$$\frac{1}{\sqrt{2}} E_s e^{i(\omega t + \phi(t) + \theta_{FS})} + E_{1F}^{(s)}(t).$$

The reflection signals from the two arms of the interferometer are recombined at the coupler 3, and half of the recombined signal power is directed into the output fiber 13. The resulting signal at location F, the entrance to the PDR, has an electric field that may be written $$\vec{E}_F(t) = \frac{1}{\sqrt{2}} \vec{E}_r e^{i(\omega t + \phi(t) + \phi_{PET}(t) + \phi_D(t) + \phi_f')} + \vec{E}_{1F}^{(r)}(t) + \quad (13)$$

$$\frac{1}{\sqrt{2}} \vec{E}_s e^{i(\omega t + \phi(t) + \theta_{FS})} + \vec{E}_{1F}^{(s)}(t).$$

Here $\vec{E}_{1F}^{(r)}$ and $\vec{E}_{1F}^{(S)}$ are the statistical components of the fields at location F having polarizations orthogonal to $\vec{E}_r$ and $\vec{E}_s$, respectively. This is the signal that is fed into the PDR 14. For simplicity we write the expression for the field $\vec{E}_F$ as:

$$\vec{E}_F(t) = \frac{1}{\sqrt{2}} (\vec{E}_r(t) + \vec{E}_s(t)), \quad (14)$$

where the subscripts r and s refer to the terms arising from the reference arm and test arm, respectively.

Figure 2:
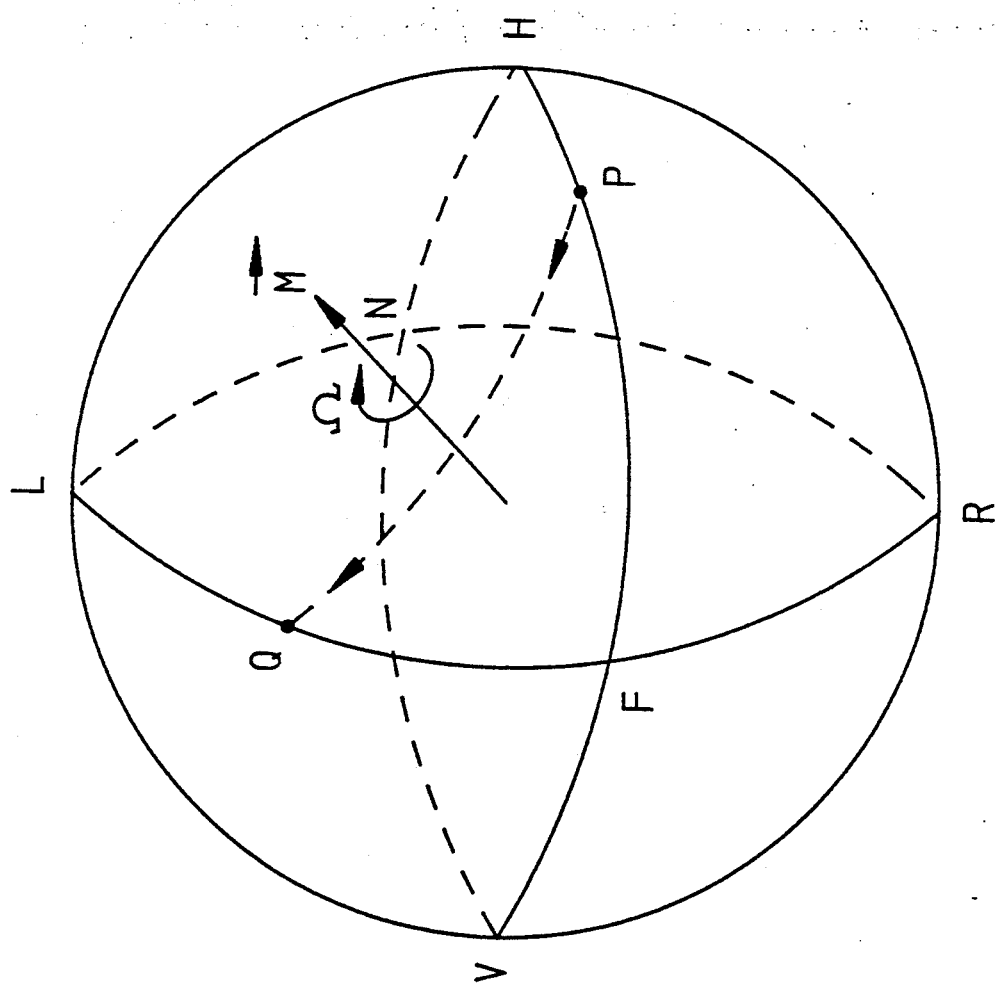
FIG. 2 is a Poincare sphere diagram illustrating the effect of rotation of the polarizer in FIG. 1 on the polarization of the reflected light from the reference beam arm of the interferometer.

In actual use, the reflectometer is first calibrated so that the reference signal $\vec{E}_r$ has equal components of horizontal and vertical linear polarization, so that equal reference beam power is directed to each branch of the PDR. This is done by first disconnecting the DUT, so that R is negligible, and then rotating the linear polarizer 9. The effect of this rotation is illustrated in FIG. 2, which is a diagram of the usual Poincare sphere. In this diagram the points V and H represent vertical and horizontal polarization states, F and N are linear polarization states at 45 degree angles, and R and L represent right and left circular polarizations respectively. It is desirable to produce a reference signal $\vec{E}_r$ having a polarization lying on the great circle L F R N, which includes all states having equal intensities of horizontal and vertical polarization.

The reflected reference beam signal at the polarizer 9 is linearly polarized. Therefore it falls on the great circle V F H N, which includes all states of linear polarization. In traveling from the polarizer to the PDR input port F, the reference beam may undergo some polarization distortion in the fibers. Any such distortion may be described as a rotation of all points on the Poincare sphere about an axis through the center of the sphere. In FIG. 2, this distortion is represented as a rotation by an angle $\Omega$ about the axis M.

From this Figure it is immediately evident that for a given rotation, ($\Omega$, M), it is always possible to find a point P on the circle V F H N which is carried by the rotation to a point Q on the circle L F R N, as shown. Therefore one can always adjust the polarizer 9 to produce a polarization state P, which will result in a polarization O at the PDR having equal components of vertical and horizontal polarization intensity.

Figure 3:
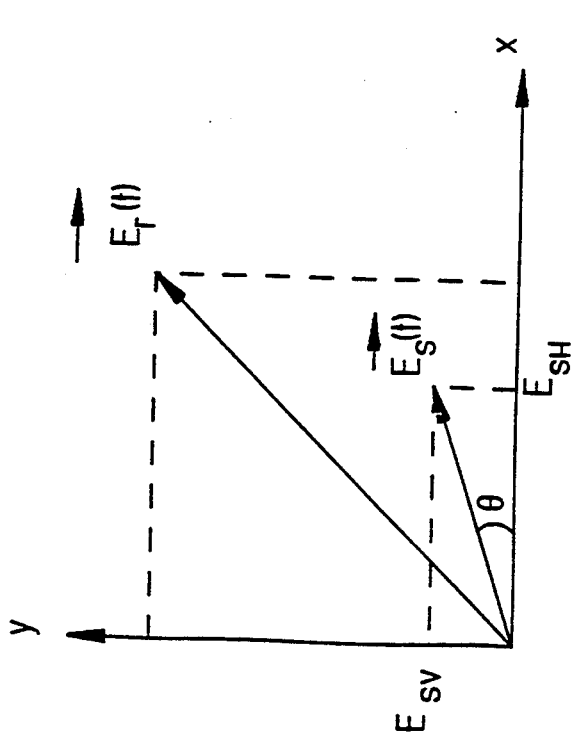
FIG. 3 is a vector diagram of the electric fields in the optical reflected signals from the reference arm and the DUT arm at the input of the PDR, showing the parameters used to describe the interference between the two signals.
Figure 4:
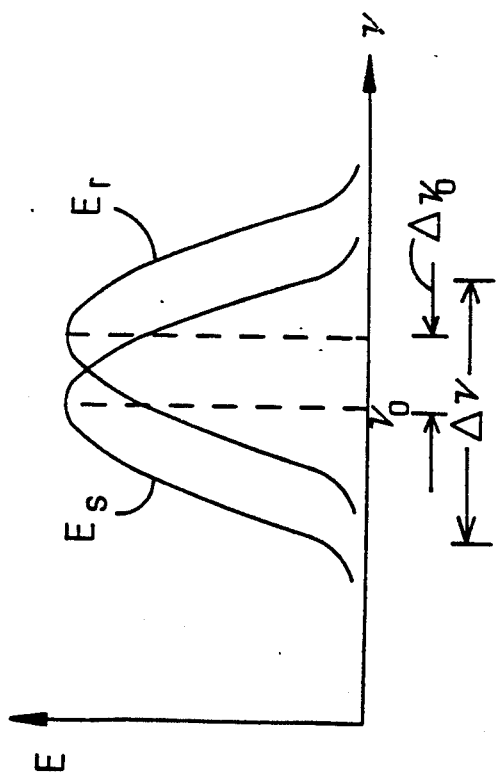
FIG. 4 is a schematic sketch of the spectral distributions of the light reflected from the DUT arm and the reference arm of the interferometer.

Referring now to FIG. 3, the electric fields at location F in the beams arriving from the two arms of the interferometer may have different polarizations. The reference field $\vec{E}_r$, after the above calibration, may have a linear polarization at an angle of 45° (points F or N of FIG. 2). Furthermore its frequency spectrum may be shifted by both the Doppler shift and the PZT phase shifts described in equation (13). FIG. 4 shows schematically the spectra of the signals $E_r$ and $E_s$; this graph is not drawn to scale.

In FIG. 3, the test arm signal is assumed to have undergone some polarization distortion. Because of the birefringence of the transmitting fibers, the horizontal and vertical polarization components will arrive out of phase with each other. Therefore we can represent these components, again in the complex representation, by:

$$E_{sH}(t) = e^{i\delta_H} \cos\theta |E_S(t)|, \quad (15)$$

$$E_{sV}(t) = e^{i\delta_V} \sin\theta |E_s(t)|. \quad (16)$$

The quantities $\delta_H$, $\delta_V$ represent the phase changes caused by this fiber birefringence. The effect of this birefringence is that equation (14) must be corrected to replace $\vec{E}_s(t)$ by $\vec{E}_s'(t)$, where $\vec{E}_s'(t)$ has horizontal and vertical polarization components given by equations (15) and (16). The actual input signal to the PDR is then:

$$E_{PDR}(t) = \frac{1}{\sqrt{2}} (E_r(t) + E_s(t)). \quad (17)$$

The photodiodes 17v, 17h generate currents that are proportional to the intensities of the vertical and horizontal polarization components of $E_{PDR}$. Ignoring an overall normalization constant (incorporating the quantum efficiency, etc.) the photocurrent generated by photodiode 17h is:

$$\begin{aligned} I_{17h}(t) &= |E_{rH}(t) + E_{sH}'(t)|^2 \\ &= |E_{rH}(t)|^2 + |E_{sH}'(t)|^2 + 2 Re E_{rH}(t) E_{sH}'^*(t). \end{aligned} \quad (18)$$

This current passes through the BPF 18h, which transmits only a window of frequencies and blocks dc and high frequency components of the signal. Therefore the current signal produced by this BPF contains only the interference terms from equation (18):

$$\begin{aligned} I_{18h} &= E_r E_s \cos\theta \cos[\phi \, O_{PET}(t) + \phi_D(t) + \theta_F^r - \theta_F^s - \delta_h] \\ &= E_r E_s \cos\theta \cos[\phi_m \cos\omega_m t + \omega_D t + \Delta\theta_F - \delta_h]. \end{aligned} \quad (19)$$

The phase difference $\Delta\theta_F = \theta_F^r - \theta_F^s$ arises from the difference in optical path length between the signal in the reference arm and that in the test arm. This difference must be less than the coherence length $l_c$ in order for an interference signal to be generated, since the BPF cannot transmit the high frequencies occurring in interference signals involving fields outside the range of the coherence domain. For this reason the $\vec{E}_{1F}$ fields don't contribute to $I_{18h}$.

The current $I_{18h}$ has a spectral component at the Doppler frequency $\omega_D$, and also components at frequencies $\omega_D + \omega_M$, $\omega_D + 2\omega_M$, . . . , where we refer here to the angular frequency. Thus the mirror 10 may scan at a certain velocity and the oscillator 7 can then be adjusted so that one of these component frequency falls within the transmission window of the BPF 18h. In this manner, the reflectometer can be operated with a fixed frequency pass band, by adjusting the frequency of the oscillator 7 to correspond to the velocity of the scanning mirror. Clearly, if the PZT is omitted, the frequency passband of the BPF must be correlated with the mirror velocity.

Figure 6:
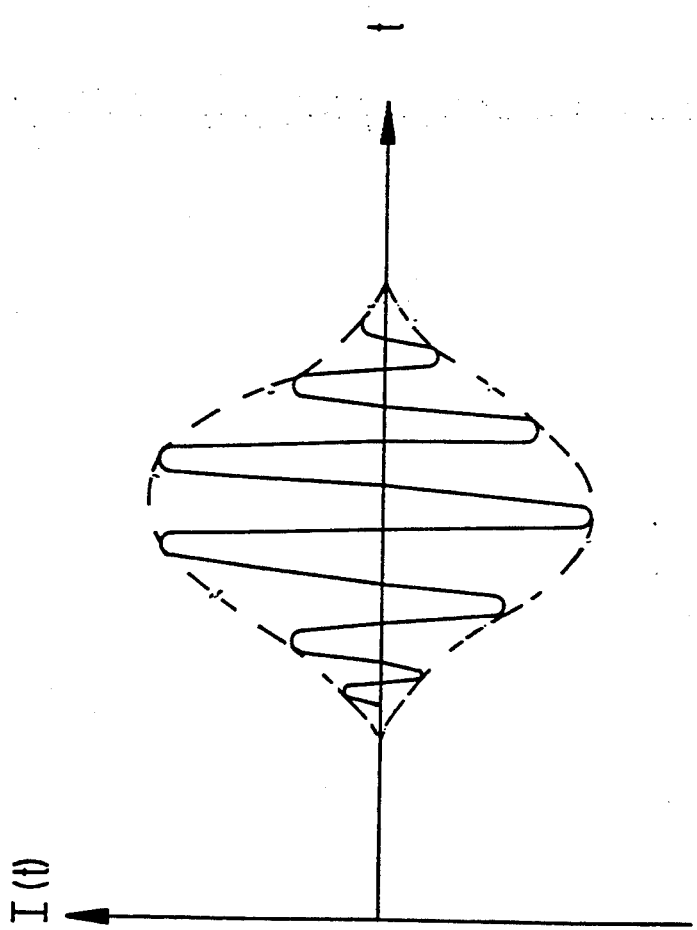
FIG. 6 shows a schematic graph of the time dependence of the photocurrent in the branch of the PDR circuit detecting the horizontal polarization component of the interferometer signal passing through the bandpass filter.

As the mirror travels through an interval in which the optical path length difference for a given reflection site is within the coherence length, a signal will thus be generated by the band pass filter 18h. FIG. 6 is a schematic plot of this signal as a function of time. The current is an oscillatory function of time at a beat frequency corresponding to the spectral component transmitted by the band pass filter, modulated by an envelope function shown by the dotted line in this figure. This envelope function has a width substantially equal to the coherence time. This current is fed into the input of the envelope detector circuit 19h, which washes out the oscillatory part of the signal and generates a current $I_{19h}$ that is proportional to the magnitude of the envelope. Omitting normalization factors:

$$I_{19h} = E_r E_s \cos\theta. \quad (20)$$

Referring still to FIG. 1, an analogous signal is generated by the envelope detector 19v for the vertically polarized component of the signal, $$I_{19v} = E_r E_s \sin\theta, \quad (21)$$

$$I_{19v}^2 + I_{19h}^2 = E_r^2 E_s^2 \quad (22)$$

and therefore the readout signal of the PDR is given by $E_r^2 E_s^2$, and is independent of $\theta$, $\delta_h$, $\delta_v$. Thus, this instrument is insensitive to polarization distortions in the reflected signal from the DUT.

Figure 7:
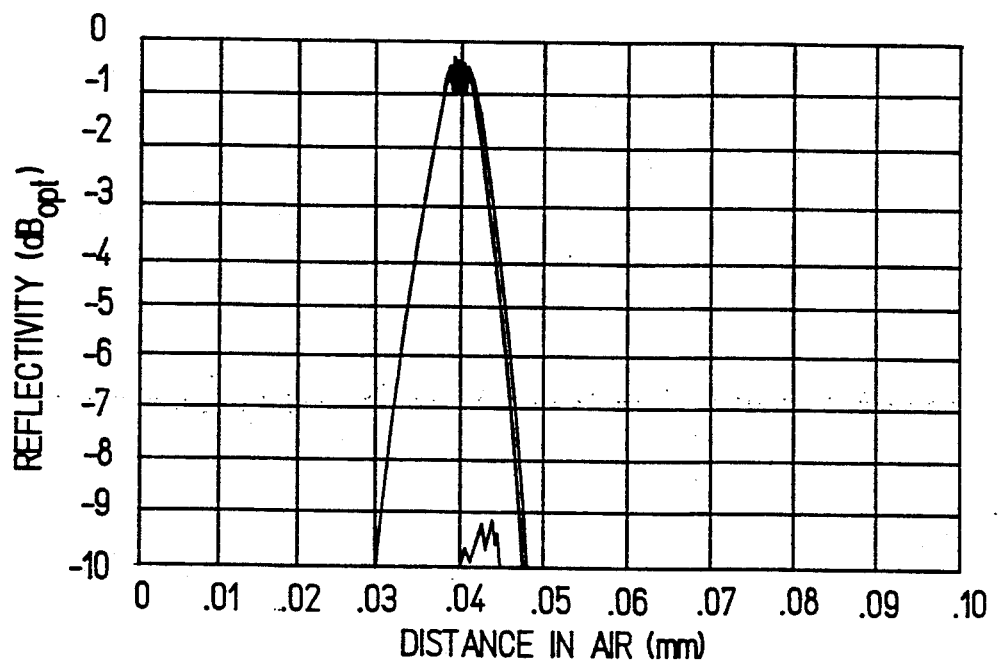
FIG. 7 is a graph of the measured optical reflectivity of the reflectometer in FIG. 1, showing the contributions of the two branches of the PDR and the total output signal as a function of the location of the scanning mirror, with the PC adjusted to produce a DUT reflection signal of primarily vertical linear polarization.
Figure 8:
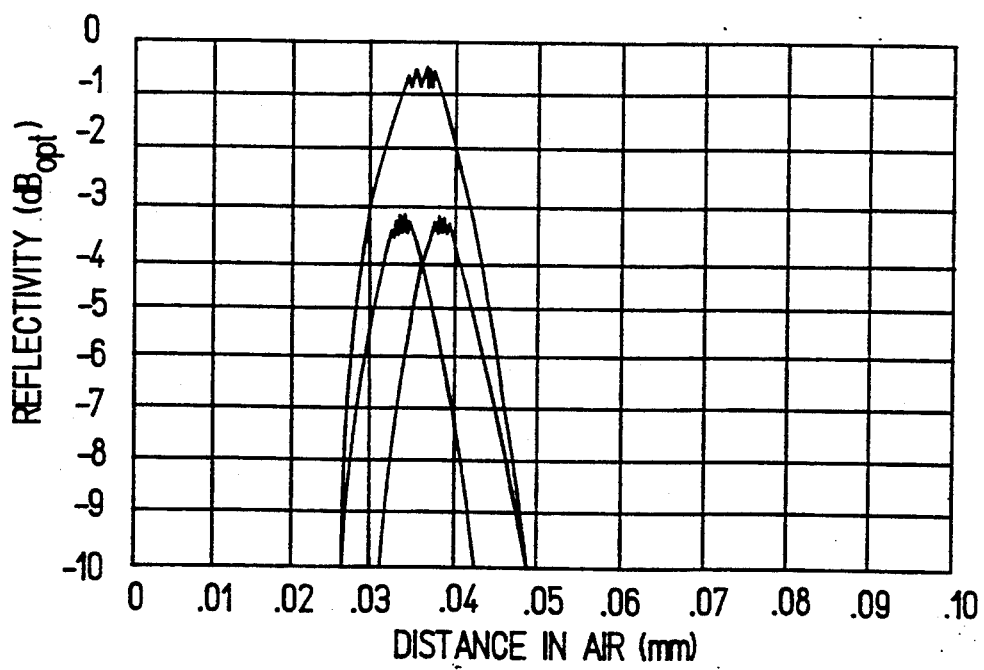
FIG. 8 is a graph of the measured optical reflectivity of the reflectometer similar to FIG. 7, with the PC adjusted to produce a DUT reflection signal having approximately equal vertical and horizontal polarization components.

FIGS. 7 and 8 illustrate the insensitivity for a reflectometer constructed according to the foregoing description. In FIG. 7, the measured reflectivity is plotted as a function of the position of the scanning mirror, with the polarization controller 11 adjusted to direct most of the DUT reflection signal into only one branch of the PDR. The reflectivity measured in each branch, as well as their sum, is plotted in this Figure. Clearly the resolution of this system is approximately 10 $\mu$m.

FIG. 8 shows the same plot where PC 11 is adjusted to direct approximately equal signal intensities into each branch of the PDR circuit. The total reflectivity is also plotted. This curve has approximately the same width as that in FIG. 8, and the peak reflectivity is less than that of FIG. 7 by approximately 0.5 dB$_{opt}$. Thus, the reflectometer system signal variation with polarization distortion is at most 0.5 dB, in this embodiment. In short, the reflectometry signal is substantially independent of polarization effects in the DUT.

It is clear from this description that the polarization controller 11 can be adjusted to substantially reduce the effect of any large systematic constant polarization effects in the DUT. One can also include PC's in the other branches of the interferometer to compensate for other systematic polarization distortion effects. A PC in the reference arm can reproduce the effect of rotating the linear polarizer 9, with improvement of stability. The entire interferometer structure may be housed in a container which prevents time-dependent external conditions from affecting the polarization, thereby increasing the insensitivity of the device to polarization distortion.

Figure 9:
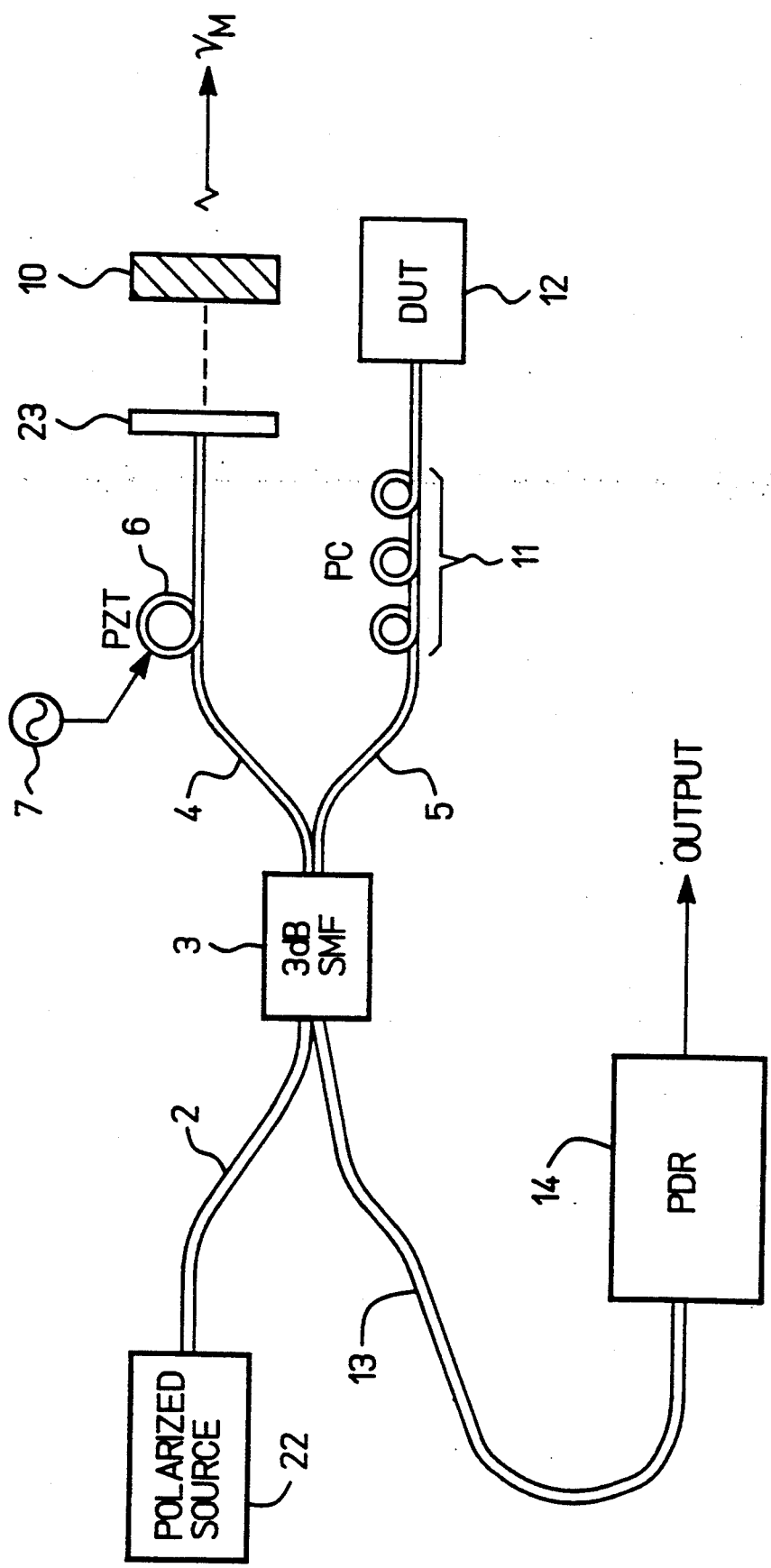
FIG. 9 is a schematic diagram of the interferometer in an alternative version of the invention having a polarized light source.

FIG. 9 shows an alternative version of the reflectometer in which the LED is replaced by a source of polarized light, 22, such as an LED source with a polarizer. In this case the polarizer of FIG. 1 is replaced by a birefringent waveplate 23. This waveplate may be rotated to balance the reference beam input to the branches of the PDR in the same way as described previously.

It is further apparent that this system is not limited to OCDR's, but it may also be used in other reflectometers having coherent signal detection means. The PDR circuit disclosed here is adapted to detect all such coherent reflectometry signals independently of any polarization distortion of these signals.

The foregoing description of a preferred embodiment of the invention has been presented for purposes of illustration and description. It is not intended to be exhaustive or to limit the invention to the precise form disclosed, and many modifications and variations are possible in light of the above teaching. The embodiment is chosen and described to best explain the principles of the invention and its practical applications to thereby enable others skilled in the art to best utilize the invention in various embodiments and with various modifications as are suitable to the particular use contemplated. It is intended that the spirit and scope of this invention are to be defined by reference to the appended claims.

What is claimed is:

1. An optical reflectometer for measuring an optical parameter of a device under test, the reflectometer comprising:

means for providing a broadband reference signal;

means for applying a broadband test signal to a device under test and receiving a response signal from said device;

a plurality of optical sensors responsive to optical signals of differing polarities for receiving the reference and response signals;

polarization control means for controlling the polarization of the reference signal to balance the sensor responses; and output means responsive to the sensors for providing an output signal indicative of an optical parameter of the device under test, the output signal being substantially independent of polarization in the response signal when the sensor responses have been balanced by the polarization control means.

2. A reflectometer as in claim 1 wherein;
   the polarization control means comprises a linear polarizer;
   the reference signal is substantially unpolarized; and
   the test signal is substantially unpolarized.

3. A reflectometer as in claim 1 wherein the polarization control means comprises a birefringent waveplate.

4. An optical reflectometer as in claim 1 further comprising phase-controlling means to change the phase of the reference signal.

5. An optical reflectometer for measuring an optical parameter of a device under test, the reflectometer comprising:

an interferometer having a light source for providing a beam of broadband light, means for dividing the beam of light into a reference signal and a test signal, means for applying the test signal to a device under test and receiving a response signal from said device, and means for combining the reference and response signals;

a polarization diversity receiver having a plurality of optical sensors responsive to optical signals of differing polarities for receiving the combined reference and response signals;

polarization control means for controlling the polarization of the reference signal to balance the sensor responses; and means in the receiver responsive to the sensors for providing an output signal indicative of an optical parameter of the device under test, the output signal being substantially independent of polarization in the response signal when the sensor responses have ben balanced by the polarization control means.

6. A reflectometer as in claim 5 wherein;
   the polarization control means comprises a linear polarizer; and
   the beam provided by the light source is substantially unpolarized.

7. A reflectometer as in claim 5 wherein the light source comprises a polarized light source and the polarization control means comprises a birefringent waveplate.

8. An optical reflectometer as in claim 5 further comprising phase-controlling means to change the phase of the reference signal.

* * * * *